(12) United States Patent
Ananthanarayanan et al.

(10) Patent No.: US 8,392,589 B2
(45) Date of Patent: *Mar. 5, 2013

(54) INTEGRATING ENTERPRISE IDENTITY AUTHORIZATION IN CONFERENCES

(75) Inventors: Krishnan Ananthanarayanan, Bothell, WA (US); Sankaran Narayanan, Redmond, WA (US); Dhigha Sekaran, Redmond, WA (US); Srivatsa Srinivasan, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/445,063

(22) Filed: Apr. 12, 2012

(65) Prior Publication Data
US 2012/0209913 A1 Aug. 16, 2012

Related U.S. Application Data (63) Continuation of application No. 12/239,367, filed on Sep. 26, 2008, now Pat. No. 8,166,184.

(51) Int. Cl.
*G06F 15/16* (2006.01)
(52) U.S. Cl. ............ 709/229; 709/206; 379/202.01
(58) Field of Classification Search .......... 709/206, 709/229; 379/202.01
See application file for complete search history.

(56) References Cited

U.S. PATENT DOCUMENTS

| | | | |
|---|---|---|---|
| 5,668,863 A * | 9/1997 | Bieselin et al. ........ 379/202.01 |
| 6,005,870 A | 12/1999 | Leung et al. |
| 6,330,320 B1 | 12/2001 | Cornell et al. |
| 6,411,605 B1 | 6/2002 | Vance et al. |
| 6,768,792 B2 | 7/2004 | Brown et al. |
| 6,920,212 B2 * | 7/2005 | Stern et al. ........... 379/202.01 |
| 7,239,688 B1 | 7/2007 | Sayko et al. |
| 7,305,562 B1 | 12/2007 | Bianco et al. |
| 7,379,455 B2 | 5/2008 | Pickett |
| 7,426,193 B2 | 9/2008 | Roher et al. |
| 2002/0071540 A1 * | 6/2002 | Dworkin ............. 379/202.01 |
| 2002/0146015 A1 * | 10/2002 | Bryan et al. .............. 370/401 |
| 2003/0055719 A1 | 3/2003 | Faigle |
| 2006/0235851 A1 * | 10/2006 | Akachi ..................... 707/9 |
| 2007/0036279 A1 | 2/2007 | Tam |
| 2007/0036298 A1 | 2/2007 | Jain et al. |
| 2007/0041548 A1 | 2/2007 | Ordille et al. |
| 2007/0156811 A1 * | 7/2007 | Jain et al. ................. 709/204 |
| 2007/0208806 A1 * | 9/2007 | Mordecai et al. ......... 709/204 |
| 2008/0010674 A1 | 1/2008 | Lee |
| 2008/0069001 A1 | 3/2008 | Sekaran et al. |
| 2008/0189292 A1 * | 8/2008 | Stremel et al. ............ 707/10 |

OTHER PUBLICATIONS

U.S. Appl. No. 12/239,367, Office Action mailed Mar. 5, 2010, 27 pgs.
U.S. Appl. No. 12/239,367, Amendment and Response filed Jun. 7, 2010, 12 pgs.
U.S. Appl. No. 12/239,367, Office Action mailed Aug. 5, 2010, 27 pgs.
U.S. Appl. No. 12/239,367, Amendment and Response filed Dec. 6, 2010, 11 pgs.

(Continued)

*Primary Examiner* — Ario Etienne
*Assistant Examiner* — El Hadji Sall
(74) *Attorney, Agent, or Firm* — Merchant & Gould P.C.

(57) ABSTRACT

Disclosed herein are embodiments for validating a user joining a conferencing session. According to various embodiments, a first identifier is received. A user is identified from a plurality of users based at least in part on the first identifier. A second identifier is received that corresponds to the first identifier and the user and the user is validated based on both the first identifier and the second identifier. The user may then join the conferencing session, with the user's identity being revealed to others attending the conferencing session.

13 Claims, 4 Drawing Sheets

OTHER PUBLICATIONS

U.S. Appl. No. 12/239,367, Office Action mailed May 25, 2011, 27 pgs.
U.S. Appl. No. 12/239,367, Amendment and Response filed Jul. 28, 2011, 13 pgs.
U.S. Appl. No. 12/239,367, Notice of Allowance mailed Dec. 20, 2011, 11 pgs.
EP Search Report in European Application 09816680, mailed Aug. 30, 2012, 6 pgs.
International Search Report and Written Opinion issued in PCT Application No. PCT/US2009/055765 dated Apr. 1, 2010, 12 pages.
BlackBerry talks to the PABX [online], May 11, 2007 [retrieved Jul. 11, 2008], Retrieved from http://www.pcpro.co.uk/news/112685/blackberry-talks-to-the-pabx.html, 2 pages.
Conference Services [online], no date available [retrieved Jul. 10, 2008], Retrieved from http://www.bustedmediatalk.co.uk/conference-services.aspx, 1 page.

* cited by examiner

INTEGRATING ENTERPRISE IDENTITY AUTHORIZATION IN CONFERENCES

CROSS-REFERENCE TO RELATED APPLICATIONS

This application is a continuation application of co-pending U.S. patent application Ser. No. 12/239,367, filed Sep. 26, 2008, which application is hereby incorporated herein by reference in its entirety.

BACKGROUND

In current teleconferencing applications no mechanism currently exists by which a user joining the conferencing session is automatically identified to other participants of the conferencing session. Nor is there a way to verify the identity of the user calling into the conferencing session. Currently, a user who joins a conferencing session is not required to validate his or her identity and may join the conferencing session so long as the user has a call-in number and a participant passcode. Thus, anyone who obtains the phone number and passcode may join the conferencing session. Furthermore, every user who joins, or is invited to join the conferencing session is given the same call-in number and passcode. Thus, the other participants must rely on the joining user to correctly identify themselves.

Another problem with current teleconferencing systems is that a user is granted fewer privileges than the user may be entitled to receive because the user may be calling into the conferencing session via a communication device with a phone number not recognized by the system. Thus, the system treats the incoming caller as an anonymous user and does not grant the user full access or privileges. In addition, if a user is identified as an anonymous user, the anonymous user is permitted access to the conferencing session for a predetermined maximum number of minutes. In other embodiments, if an anonymous user joins the conference and there is no enterprise user in the conference, the anonymous user is only given the maximum number of minutes. In either case, once the minutes expire, the anonymous user is dropped from the conferencing session.

It is with respect to these and other considerations that embodiments of the present invention have been made. Also, although relatively specific problems have been discussed, it should be understood that embodiments of the present invention should not be limited to solving the specific problems identified in the background.

SUMMARY

Embodiments described herein provide for integrating enterprise identity authorization in conferencing sessions. Although the embodiments described herein may be used for resolving the identity of a user joining a conferencing session conducted by telephone, it is contemplated that they may also be used in other types of conferencing schemes where a user should be validated prior to joining.

Disclosed herein is an embodiment for validating a user joining a conferencing session. According to an embodiment, a first identifier is received which identifies a user from a group of users. The identifier may be a phone extension, user selected combination of numbers or a session initiation protocol uniform resource identifier. A second identifier, selected and input by the user, is also received. The second identifier has a corresponding relationship with the first identifier and the user. When both identifiers have been received, the user is validated based on both the first identifier and the second identifier. When validated, the user is permitted to the conferencing session.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Embodiments of the present disclosure may be more readily described by reference to the accompanying drawings in which like numbers refer to like items and in which.

DETAILED DESCRIPTION

This disclosure more fully describes embodiments with reference to the accompanying drawings, in which some of the possible embodiments are shown. Other aspects, however, may be embodied in many different forms and the inclusion of specific embodiments in the disclosure should not be construed as limiting such aspects to the embodiments set forth herein. Rather, the embodiments depicted in the drawings are included to provide a disclosure that is thorough and complete and which fully conveys the intended scope to those skilled in the art. When referring to the figures, like structures and elements shown throughout are indicated with like reference numerals.

Figure 1:
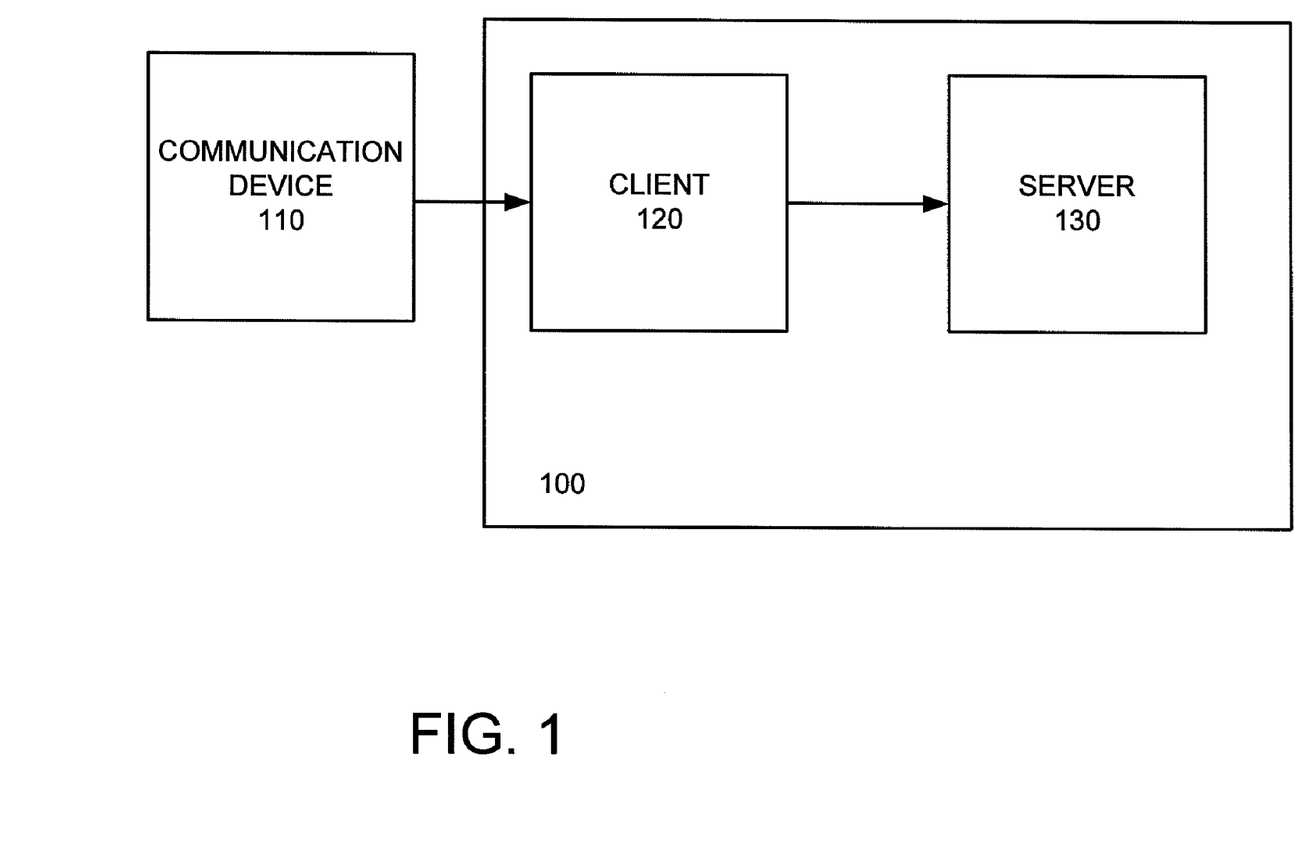
FIG. 1 is a block diagram of a system used to validate a user joining a conferencing session.

FIG. 1 shows a block diagram of a system 100 that may be used to validate a user joining a conferencing session. According to an embodiment, a user uses communication device 110 to connect to a conferencing session. The communication device 110 may be any type of communication device using various types of connections. For example, the communication device may be a cell phone, satellite phone, voiceover internet protocol (VOIP) phone or land line phone. In addition, the conferencing session may be any type of conferencing session that one or more users may join via a telephone or other communication device. In addition, the conferencing session may support voice and video data. Other features, such as supplying various documents (i.e., spreadsheets, word processing documents, etc.) needed for the conferencing session may also be sent to each verified participant.

In an embodiment, a user using the communication device 110 calls a predetermined number in an attempt to connect to a conferencing session. The predetermined number may be a number unique to the particular conferencing session or may be a general number, such as a toll-free number. Once the general number has been dialed the user selects a particular conferencing session to join.

According to an embodiment, the user connects to the client 120 via the entered telephone number. In an embodiment the client 120 is a Conference Auto Attendant (CAA) used to connect incoming calls to various conferencing sessions. Alternatively, the client 120 may be any other type of Conferencing Bridge that accepts VOIP and other internet based connections.

The client 120 identifies the user based on a first identifier. According to an embodiment, the user is identified by the extension of the phone number of the communication device which places the call to the client 120. Once the extension is received, the client 120 sends the extension to a server 130. In an embodiment server 130 is an Office Communications Server by MICROSOFT® Corp. of Redmond Wash. It should be understood that in other embodiments other server applications providing similar functionality may be used.

The sever 130, validates the user based on the received extension and the user's identity is returned to the client 120. The client 120 may then prompt the user to enter a personal identification number (PIN) which is subsequently sent to the server 130. The server 130 attempts to resolve the PIN to ensure that the user's identity is valid and that the user should be permitted to join the selected conferencing session. A successful verification by the server 130 may result in returning to the client 120 a uniform resource identifier (URI) of one or more conferencing sessions the user has permission to join. The user may then select the conferencing session to join. Alternatively, the user is automatically joined to a particular conferencing session.

Figure 2:
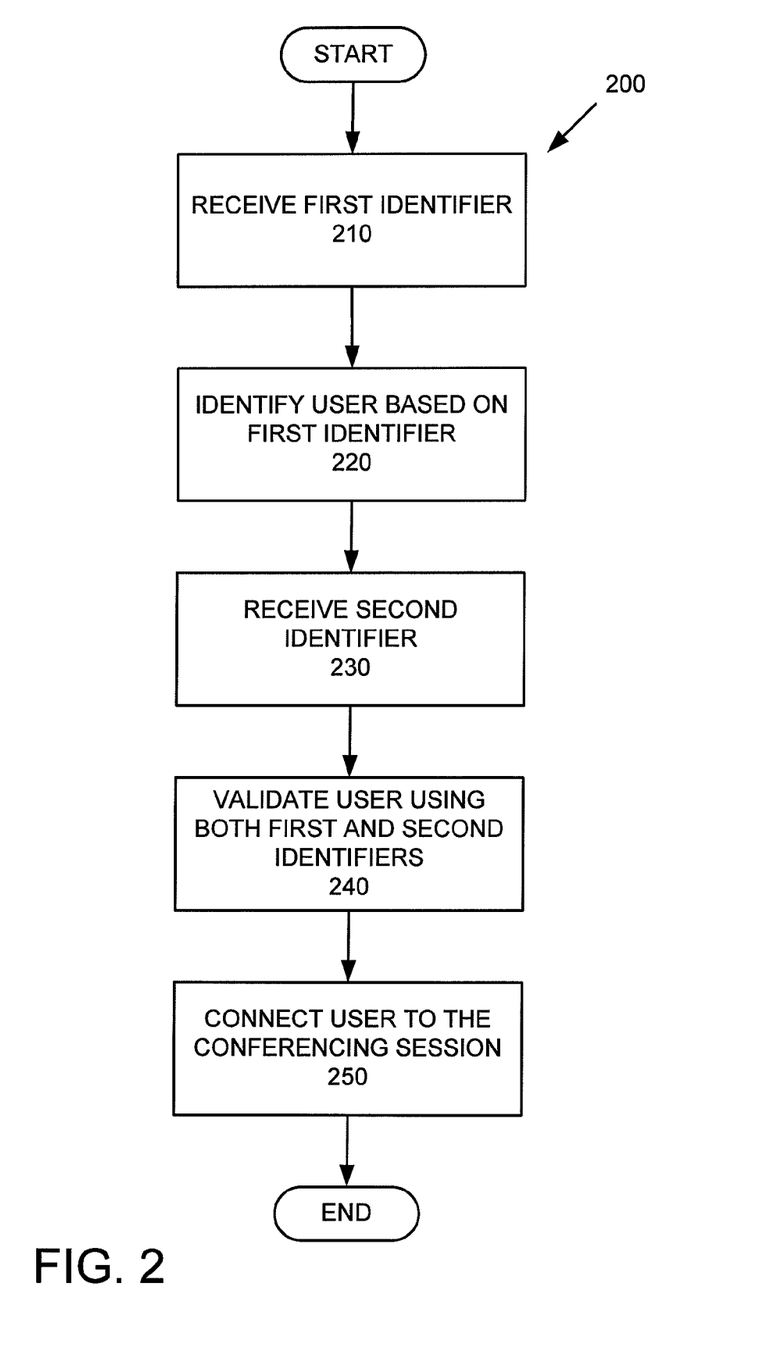
FIG. 2 illustrates a method for connecting a user to a conferencing session according to an embodiment.
Figure 3:
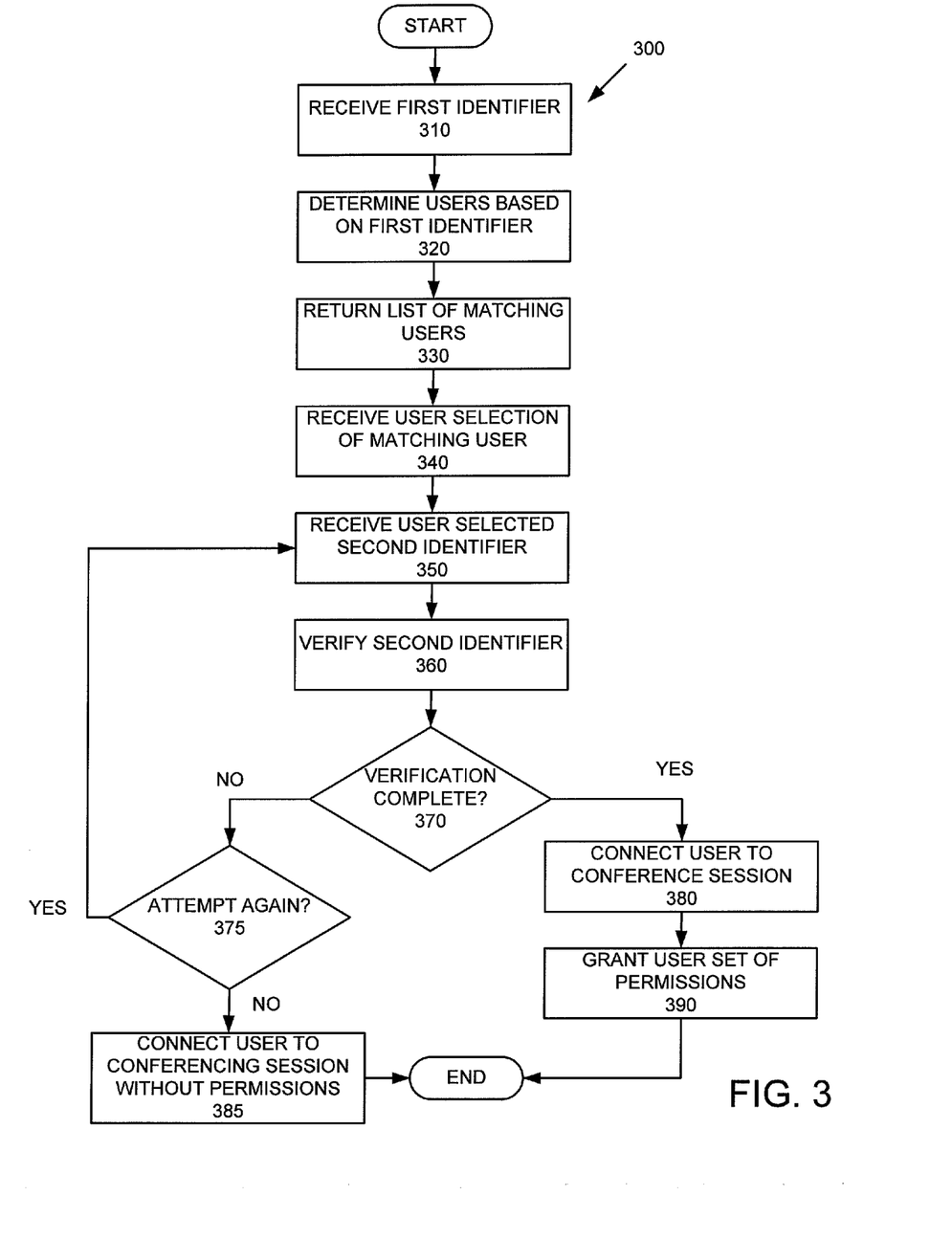
FIG. 3 illustrates another method for connecting a user to a conferencing session according to an embodiment.

FIGS. 2 and 3 illustrate methods, according to embodiments. The methods illustrated in FIGS. 2 and 3 may be performed in any suitable environment. For example, in environments such as illustrated in FIG. 1. Therefore, the description of FIGS. 2 and 3 may refer to at least one of the components of FIG. 1. However, any such reference is for descriptive purposes only, and it is to be understood that the implementations of FIG. 1 are non-limiting environments.

FIG. 2 illustrates a method 200 for connecting a user to a conferencing session according to an embodiment. In step 210 a first identifier is received by a client device. According to an embodiment, the identifier is the extension portion of the phone number of the communication device from which the user is calling or connecting. For example, if the user is attempting to call a conferencing session from a communication device having the phone number (292)-123-4567, the extension may be the last five digits of the phone number. Thus, the extension would be 34567. In embodiments, the extension is received automatically by the client device as the user places the call to the client using for example caller ID functionality.

Alternatively, the extension may not be associated with the particular communication device of the user but may be a custom identifier assigned or selected by the user. In such scenarios, users may select and manually enter an extension of their choice or be assigned an extension (e.g., an office phone number extension). Once the extension has been registered by the system, the user may join conferencing sessions from various communication devices and is not limited to one particular communication device with which the user must use to connect to the conferencing session. In an alternative embodiment, the extension may be part of an IP address or email account associated with the user.

The client receiving the call may use the received identifier to look up the name and verify the phone number of the user placing the incoming call. This may be accomplished using a caller identification feature which pulls the necessary information from the phone number (i.e., the extension) of the incoming call for later use. In cases where a custom identifier is used, the user may be prompted to manually enter the custom identifier. Once the first identifier has been registered, the user may input the custom identifier when calling in from various communication devices from a variety of locations, e.g., a cell phone, office phone, home phone etc.

Upon receiving the first identifier, the method proceeds to step 220 in which the user is identified based on the first identifier. In this step, the client device sends the first identifier to the server. The server then maps the first identifier to all user uniform resource identifiers that have the same identifier. In some embodiments there may be only one user with a particular identifier. In other embodiments, there may be more than one user with the same identifier. Once the user or users have been identified based on the first identifier, the server returns a list of users whose identifiers match the received identifier to the client.

As will be explained below, in embodiments where more than one user is identified by the first identifier, a user may be prompted to manually select the identity that corresponds to the user. Once the user's correct identity has been identified, step 230 provides that the user is prompted to manually enter in a second identifier. According to an embodiment the second identifier is a personal identification number or PIN. This PIN may be any combination of numbers of a predetermined length, the number being known only to the user and system to which the user has registered with. When entered by the user, the PIN may be encrypted by the client and transmitted to the server. According to an embodiment, the PIN may be encrypted using any standard encryption algorithms.

In embodiments where a user has not been associated with either a first or second identifier, the system may require the user to register with the system. Registering with the system may include registering the phone number of the communication device from which the user will make calls to the client. The user may be prompted to select and register a custom first identifier. The user may also be prompted to enter and register a second identifier. The second identifier may be encrypted using a hashing function and subsequently stored on the server. In one embodiment, the encrypted second identifier is stored in any format on the server.

In step 240 the user is validated using the received first and second identifiers. According to an embodiment, the second identifier is input by the user and compared to the user's identifier that was stored at the server during initial registration. If there is a match, the user is verified. In embodiments, the second identifier input by the user is encrypted and transmitted to the server. The encrypted second identifier is then compared against the second identifier stored at the server. If the validation is successful, step 250 provides that the user is connected to the conferencing session.

Because the user was verified using the both the first and second identifiers, other participants of the conferencing session know the identity of the user. Furthermore, because of the confidential nature of the second identifier, each participant in the conference can be confident that the user actually is the person the user claims to be.

FIG. 3 illustrates a more detailed method for connecting a user to a conferencing session according to an embodiment. In step 310, a first identifier is received by the client. The first identifier may be automatically received by the client. The identifier is automatically received, in embodiments, when a user uses a communication device to connect to the client when attempting to join the conferencing session. Alternatively, the user may manually enter in the first identifier when prompted. As explained above, this identifier may be a phone extension, IP address, or user selected combination of numbers. The first identifier may also be any combination of characters (i.e., letters, numbers, and symbols).

According to an embodiment, the user is required to be registered. In these embodiments the user must register the phone number of the communication device or a custom identifier. As indicated above, part of the registration process may include the user entering a second identifier which may be subsequently stored at and retrieved from a server.

When the first identifier has been received, step 320 provides that one or more users are identified based on the first identifier. As explained above, the identifier may be either automatically received or manually input by the user. Manually inputting the identifier may comprise a physical act of pressing buttons on a user's phone, computer or other handheld device. In an alternative embodiment, the user may speak the numbers or characters of the first identifier into the communication device.

As the number of users increases, there is an increased likelihood that one or more users may have, or may have selected, the same first identifier. Continuing the example from above, a first user may have the phone number (292)-123-4567 associated with the user's communication device while a second user may have the phone number (303)-223-4567 associated with the second user's communication device. Thus, in situations where the identifier is an extension, each user has the same extension of 34567. Therefore, the identities of the first user and the second user will be returned to the client when the first user connects to the client. Similarly, in embodiments where the user may select a custom first identifier, there may be one or more users with the same custom identifier or situations in which a custom identifier matches a phone extension.

In situations in which more than one user is identified in step 320, step 330 provides that a list of all users whose first identifier matches the first identifier received by the client is returned. When received, the client presents the list to the user. In an embodiment, the list of matching users may be returned to the user in an audible manner, such that the user using the communication device may audibly hear the list of users. In an alternative embodiment, the list of users may be returned in a visual format that shows the names of all users whose identifiers match that particular first identifier.

In step 340 the user selects the correct name or identity from the list of names returned by step 330. The selection may be made either through a key press or by the user audibly speaking the correct name or corresponding number that represents the user's name. For example, a list may be returned that lists the name "Steve Smith" in position one and "John Jones" in position two. The user may receive an audible or written instruction that prompts the user to press or say "one" if the user's name is "Steve Smith" and prompt the user to press or say "two" if the user's name is John Jones etc.

In an alternative embodiment in which more than one user has been identified, the client may utilize the entire phone number of the communication device from which the user placed the call instead of using only the extension. In this particular embodiment, the first identifier may include the phone number including area code and/or country code. According to this embodiment and continuing the example from above, the user's first identifier may be 2921234567. If more digits are needed to distinguish one user from another, the country code from which the user calls from may also be included as part of the identifier. In implementations where the user has selected a custom identifier that is not based on the phone number of the communication device, the user may still be identified based on the custom identifier and phone number of the communication device, including the area code and/or country code.

After the appropriate user has been selected from the list of users, step 350 provides that the user enters a second identifier. This second identifier is in embodiments a user's personal identification number (PIN). The PIN acts as a password and verifies that the user is indeed the person the user is claiming to be.

Once the user has input the second identifier in step 350, step 360 provides that the second identifier is verified. The verification step may be implemented using standard encryption/decryption algorithms. In cases where the user has not previously entered a second identifier (i.e., the user is attempting to join a conferencing session for the first time) the user may be prompted to enter in the second identifier or PIN number. Once entered, the second identifier may be encrypted and stored at the server. Alternatively, each new user to the system may be granted a default second identifier when first accessing the conferencing session which the user must subsequently change.

A determination is made in step 370 as to whether the first and second identifiers received match the identifiers that were initially registered by the user. If the first and second identifiers validate the identity of the user, flow branches to step 380 and the user is permitted to join the conferencing session. When the user is identified and subsequently joins the conferencing session, an audible notification, stating the user's name, may be played to all other participants in the conferencing session notifying them that this particular user has joined. In an embodiment, the audible notification stating the user's identity is played only after the user's identity has been verified. Thus, each session attendee may feel confident that the identity of the user joining the session has been validated and the user is who he claims to be.

In an embodiment, if the user has not been verified the user is still allowed to join the conference however the user joins as an anonymous attendee. As a result, the audible notification is not played. Alternatively, an audible notification stating that an anonymous user has just joined the session may be played and the user may be given an option to state his or her name. In other embodiments, the user is prevented from joining a conference if the user is not identified. This embodiment is useful in situations where the conference involves sensitive subject matter.

When a user joins a conferencing session, there may be a set of privileges the user is entitled to receive. According to an embodiment, the privileges may be linked to the user based on the user's first or second identifier. Step 390 provides that any privileges associated with the user for that particular conferencing session are granted to the user.

For example, some of the privileges granted to the user may be the privilege of distributing or gaining access to one or more documents or items relating to the conferencing meeting. The set of privileges may also allow the use of video and sound feeds. Other privileges may include the ability to conduct the meeting, or to enable the user to be connected to the session for the duration of the session. In embodiments, if a user's identity has not been verified and the user joins the conferencing session as an anonymous user, the anonymous user may be permitted to join only for a specified maximum amount of time (i.e., ten minutes). In an embodiment, the maximum amount of time is given to an anonymous user only if an enterprise user is not in the conference. If an enterprise user is in the conference the maximum amount of time may not apply to the anonymous user.

If, it is determined in step 370 that the second identifier entered by the user is not valid, flow passes to step 375 in which the user may be allowed to re-enter the second identifier. Although the user may be allowed to re-enter the second identifier, the system may prevent the user from re-entering the second identifier an unlimited amount of times. For example, the user may be permitted a maximum number of incorrect attempts within a certain time period (i.e., the user is allowed to enter an incorrect second identifier three times within a twenty four hour period). According to an embodiment, once the number of attempts have been exhausted, the user and corresponding first identifier may be locked out of the system and the user may not be permitted additional attempts to enter the second identifier. However, other embodiments provide that entering the wrong second identifier followed by entering the correct identifier resets the number of incorrect attempts and/or timer to zero. Once a user has been "locked out" from attempting to enter in the second identifier, the user may be prompted to reset the password or contact an administrator to assist the user in resetting and changing the second identifier.

In cases where an incorrect second identifier was entered and the user wishes to re-enter the second identifier, flow proceeds from step 375 back to 350 in which the user in prompted to enter the second identifier again. Although it is shown in FIG. 3 that the method proceeds from step 375 to 350, it is contemplated that the user may elect to input an alternative first identifier and proceed from step 310.

If however, the user in step 375 does not wish to attempt to enter the second identifier again, flow passes to step 385 in which the user is permitted to join the conferencing session but does so without any of the privileges that would normally be associated with the user. Thus, the user joining the conferencing session is joined as an anonymous user and is not automatically identified by name to each of the other participants.

The embodiments described herein have numerous other advantages and features. Some of the features include enabling a conferencing session organizer to give one group of users a first set of privileges while giving a second group of users a second, different set of privileges. Additionally, the settings of a conferencing session may be configured to allow a maximum number of participants or only allow certain users specified by name and/or extension. For example, a session organizer may invite only a certain number of users and identify the users based on the user's name and/or first identifier. If a user does not input the correct first identifier and is not subsequently validated, the user may not join the session, even as an anonymous user.

Alternative embodiments provide for a method similar to the one described with respect to FIG. 3 but include situations in which a user may have one or more conferencing sessions scheduled. In cases such as this, once the user has entered in the first identifier and second identifier, and has been verified, the user may select one conferencing session from a list of multiple conferencing sessions the user is scheduled to attend. According to this embodiment, the server may have access to, or be connectable with, a second server from which calendaring data or Personal Information Management (PIM) data may be stored. Based on this, the server, such as Office Communications Server may access each of the meetings on a given day and present an option to the user as to which conferencing session the user wishes to join. As with other aspects described above, this list may be presented to user in an audible manner or may be presented to the user on a display. It is also contemplated that the user may have been granted a different set of privileges for each conferencing session the user is scheduled to attend. Each set of privileges may be granted to the user based on the selection of the conferencing session the user is selects to attend.

Figure 4:
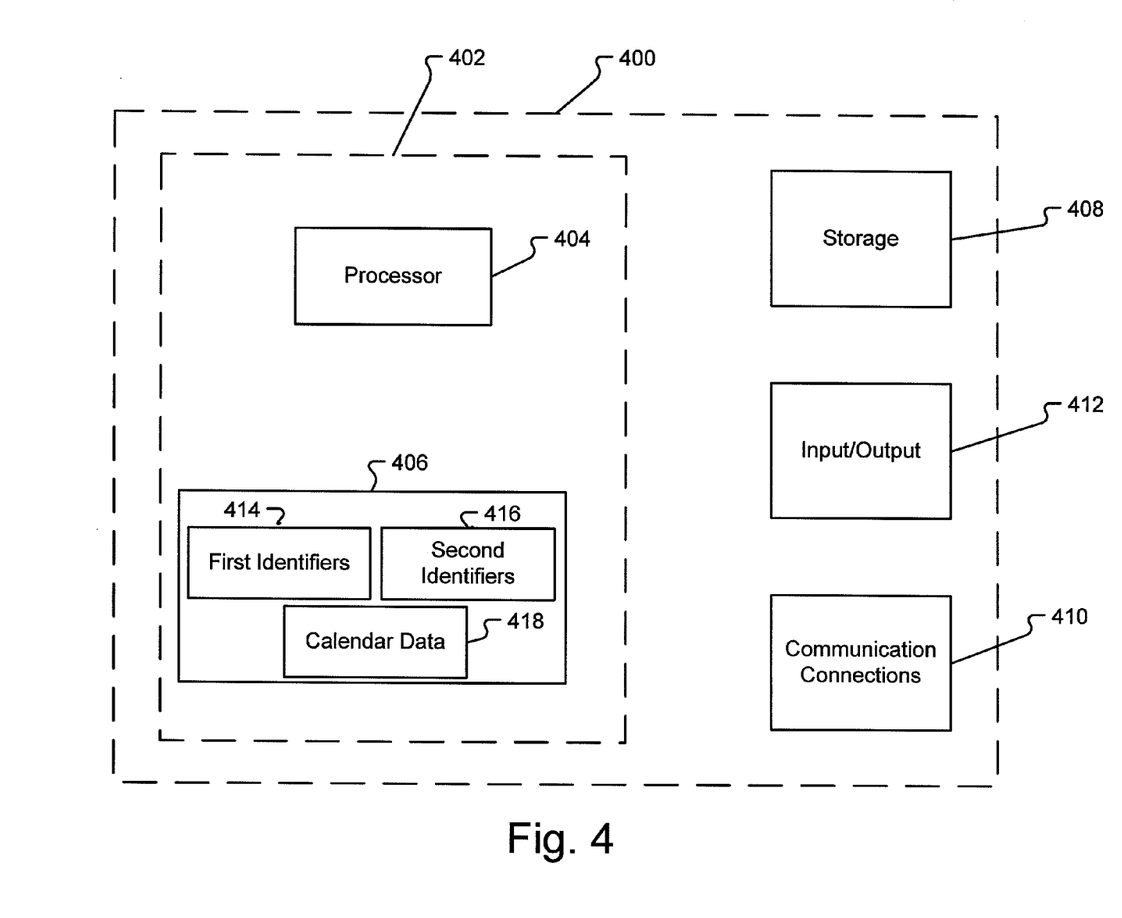
FIG. 4 is a block diagram illustrating a computer environment suitable for implementing embodiments.

With reference to FIG. 4, an embodiment of a computing environment for implementing the various embodiments described herein includes a computer system, such as computer system 400. Any and all components of the described embodiments may execute as or on a client computer system, a server computer system, a combination of client and server computer systems, a handheld device, and other possible computing environments or systems described herein. As such, a basic computer system applicable to all these environments is described hereinafter.

In its most basic configuration, computer system 400 comprises at least one processing unit or processor 404 and system memory 406. The most basic configuration of the computer system 400 is illustrated in FIG. 4 by dashed line 402. In some embodiments, one or more components of the described system are loaded into system memory 406 and executed by the processing unit 404 from system memory 406. Depending on the exact configuration and type of computer system 400, system memory 406 may be volatile (such as RAM), non-volatile (such as ROM, flash memory, etc.), or some combination of the two.

Additionally, computer system 400 may also have additional features/functionality. For example, computer system 400 includes additional storage media 408, such as removable and/or non-removable storage, including, but not limited to, magnetic or optical disks or tape. In some embodiments, software or executable code and any data used for the described system is permanently stored in storage media 408. Storage media 408 includes volatile and non-volatile, removable and non-removable media implemented in any method or technology for storage of information such as computer readable instructions, data structures, program modules, or other data. In embodiments.

System memory 406 and storage media 408 are examples of computer storage media. Computer storage media includes RAM, ROM, EEPROM, flash memory or other memory technology, CD-ROM, digital versatile disks ("DVD") or other optical storage, magnetic cassettes, magnetic tape, magnetic disk storage, other magnetic storage devices, or any other medium which is used to store the desired information and which is accessed by computer system 400 and processor 404. Any such computer storage media may be part of computer system 400. In embodiments, system memory 406 and/or storage media 408 stores data used to perform the methods or form the system(s) disclosed herein. In embodiments, system memory 406 stores information such as first identifiers 414, second identifiers 416, and calendar data 418.

Computer system 400 may also contain communications connection(s) 410 that allow the device to communicate with other devices. In embodiments, communications connection(s) 410 may be used to transmit and receive messages between sender devices, intermediary devices, and recipient devices. Communication connection(s) 410 is an example of communication media. Communication media may embody a modulated data signal, such as a carrier wave or other transport mechanism and includes any information delivery media, which may embody computer readable instructions, data structures, program modules, or other data in a modulated data signal. The term "modulated data signal" means a signal that has one or more of its characteristics set or changed in such a manner as to encode information or a message in the data signal. By way of example, and not limitation, communication media includes wired media such as a wired network or direct-wired connection, and wireless media such as an acoustic, RF, infrared, and other wireless media. In an embodiment, the methods described above may be transmitted over the communication connection(s) 410.

In some embodiments, computer system 400 also includes input and output connections 412, and interfaces and peripheral devices, such as a graphical user interface. Input device(s) are also referred to as user interface selection devices and include, but are not limited to, a keyboard, a mouse, a pen, a voice input device, a touch input device, etc. Output device(s) are also referred to as displays and include, but are not limited to, cathode ray tube displays, plasma screen displays, liquid crystal screen displays, speakers, printers, etc. These devices, either individually or in combination, connected to input and output connections 412 are used to display the information as described herein. All these devices are well known in the art and need not be discussed at length here.

In some embodiments, the component described herein comprise such modules or instructions executable by computer system 400 that may be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some embodiments, computer system 400 is part of a network that stores data in remote storage media for use by the computer system 400.

This disclosure described some embodiments of the present disclosure with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art.

Although the embodiments have been described in language specific to structural features, methodological acts, and computer-readable media containing such acts, it is to be understood that the possible embodiments, as defined in the appended claims, are not necessarily limited to the specific structure, acts, or media described. One skilled in the art will recognize other embodiments or improvements that are within the scope and spirit of the present disclosure. Therefore, the specific structure, acts, or media are disclosed only as illustrative embodiments. The disclosure is defined by the appended claims.

What is claimed is:

1. A method for validating a user joining a conferencing session, the method comprising:
   receiving, by at least one processor, a first identifier;
   identifying, by the at least one processor, the user from a plurality of users based on the first identifier;
   receiving, by the at least one processor, a second identifier that corresponds to the first identifier and the user;
   validating the user based on both of the first identifier and the second identifier;
   joining the user to the conferencing session;
   receiving the user's calendaring data, wherein the calendaring data contains data representing one or more conferences the user is scheduled to attend; and
   presenting to the user one or more conferencing sessions the user may join and accepting a user input that identifies the conferencing session the user will join; and
   associating a first set of privileges with a first one of the one or more conferencing sessions and associating a second set of privileges with a second one of the one or more conferencing sessions.

2. The method of claim 1, wherein the second identifier is a user selected personal identification number.

3. The method of claim 1, further comprising granting the user a third set of privileges after the validating.

4. The method of claim 3, further comprising denying the user the third set of privileges when the first or the second identifier has not been validated.

5. The method of claim 1, further comprising audibly introducing the user to one or more participants of the conferencing session.

6. The method of claim 1, further comprising:
   audibly presenting to the user a list of the one or more conferencing sessions the user is scheduled to attend; and
   receiving user selection of one of the one or more conferencing sessions.

7. A computer storage medium not consisting of a propagated data signal and storing computer readable instructions for executing a method to validate an identity of a user attempting to join a conferencing session, the method comprising:
   automatically receiving a first identifier;
   resolving the user's identity based on the first identifier;
   receiving, by user input, a second identifier, wherein the second identifier is associated with a predetermined first set of privileges;
   when the second identifier is validated, joining the user to the conferencing session and granting the user the predetermined first set of privileges;
   receiving the user's calendaring data, wherein the calendaring data contains data representing one or more conferences the user is scheduled to attend;
   presenting to the user one or more conferencing sessions the user may join and accepting a user input that identifies the conferencing session the user will join;
   associating a second set of privileges with a first one of the one or more conferencing sessions and associating a third set of privileges with a second one of the one or more conferencing sessions; and
   when the second identifier is not validated, joining the user access to the conferencing session and denying the user the first set of privileges associated with the second identifier.

8. The method of claim 6, wherein the second identifier is a user selected personal identification number.

9. The method of claim 6, further comprising audibly introducing the user to one or more participants of the conferencing session.

10. A system configured to validate a user attempting to join a conferencing session, the system comprising:
    a processor; and
    a memory coupled to the processor, the memory comprising computer-program instructions executable by the processor for:
    identifying a user from a plurality of users based on a first identifier;
    validating the user based on a second identifier, wherein the second identifier is input by the user;
    granting the user a first set of privileges and connecting the user to the conferencing session when the second identifier is validated;
    denying the user the first set of privileges and connecting the user to the conferencing session when the second identifier is not validated; and
    receiving the user's calendaring data, wherein the calendaring data contains data representing one or more conferences the user is scheduled to attend;
    presenting to the user one or more conferencing sessions the user may join and accepting a user input that identifies the conferencing session the user will join; and
    associating a second set of privileges with a first one of the one or more conferencing sessions and associating a third set of privileges with a second one of the one or more conferencing sessions.

11. The system of claim 10, further comprising:
audibly presenting to the user a list of the one or more conferencing sessions the user is scheduled to attend.

12. The system of claim 10, wherein the second identifier is a user selected personal identification number.

13. The system of claim 10, further comprising audibly introducing the user to one or more participants of the conferencing session.

* * * * *